Sept. 16, 1941. F. J. YOUNG 2,256,159
RUBBER HYDROCHLORIDE SIPPER
Filed Nov. 9, 1939
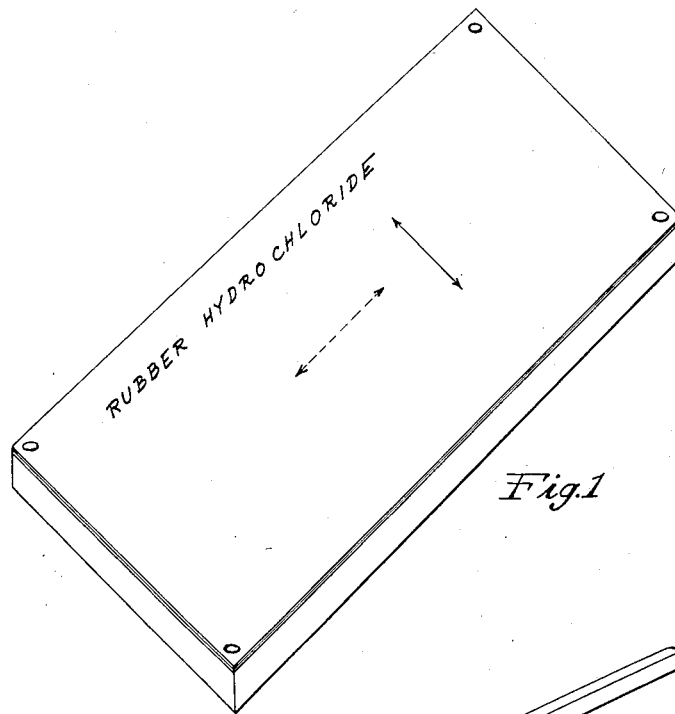
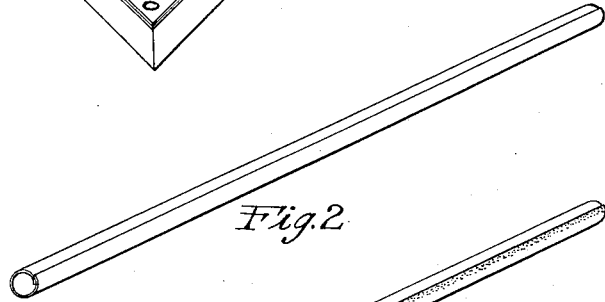
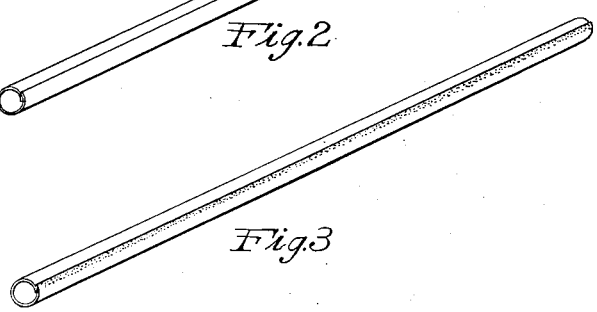
Inventor
Foster J. Young Patented Sept. 16, 1941

2,256,159

UNITED STATES PATENT OFFICE 2,256,159

RUBBER HYDROCHLORIDE SIPPER

Foster J. Young, Kent, Ohio, assignor to Wingfoot Corporation, Wilmington, Del., a corporation of Delaware Application November 9, 1939, Serial No. 303,633

5 Claims. (Cl. 154—8)

This invention relates to a straw or sipper for sucking up a beverage from a glass. The sipper is made of rubber hydrochloride. The rubber hydrochloride has a natural curl which makes it adapted for forming into sippers. The invention includes the product as well as the process of making it.

Rubber hydrochloride film produced by casting a cement of rubber hydrochloride and evaporating the solvent is normally a balanced film; i. e. it contains no strain which causes the film to curl. The film normally lies perfectly flat. The rubber hydrochloride film from which the sippers of this invention are formed is an unbalanced rubber hydrochloride film which has a tendency to curl. This is preferably formed by laminating two sheets of rubber hydrochloride which have been subjected to different stretching operations and heating to cause some retraction of the stretched film. If one film is stretched longitudinally, for example 200%, and the other laterally, for example 200%, and the two films are united by heat, the laminated sheet curls up. If the film is heated to 220 or 230° F., a good bond is formed, no pressure being necessary except to remove air bubbles from between the plies and to cause the plies to lie flat. If solvent or adhesive is used for lamination, slight heating will cause the film to curl. The edges of the sheet roll toward the center. Such a tendency to curl may be produced in a number of ways. Regardless of how it is produced the invention relates to taking rubber hydrochloride film which has this tendency to curl and using it for the manufacture of sippers. For example, a laminated sheet such as that described above may be cut into strips which may, for example, be one inch wide. These strips naturally curl up and by properly uniting overlapping portions, a suitable sipper is formed. The union may be formed by solvent or adhesive or by a heat-seal. The curl may be such that there are several overlapping layers of the film in a single sipper or the sipper may be made from a single layer of material which is overlapped just enough to effect a proper seal.

Instead of causing the film to curl as above described, other means may be employed. For example, ordinary cast film may be laminated to film which has been stretched, preferably film which has been stretched laterally. This causes the laminated sheet to curl. Or two plies of film stretched in one direction laminated to a single ply stretched to a greater extent in a perpendicular direction will curl when heated.

The film should be relatively thin, for example, it should be around one thousandth of an inch thick. The stretched film is advantageously produced by heating cast film and stretching it and then allowing it to cool while it is held under tension.

The film may, of course, be dyed with dyestuffs or colored by pigments and suitable color effects may be produced by laminating films which are colored differently.

The invention is further illustrated in the accompanying drawing in which Fig. 1 shows a view in perspective of a laminated sheet which is tacked down to prevent its curling. Fig. 2 shows a strip of the film before sealing and Fig. 3 shows a strip of the film after sealing.

In Fig. 1 the full arrow indicates the direction in which the upper ply of the film has been stretched and the dotted arrow shows the direction in which the under ply has been stretched. Each ply may be stretched 200%. The two plies have been united by applying a small amount of solvent such as chloroform to one of the surfaces to be united and then pressing the two together with slight heating, enough to produce the desired curl. This forms a uniform bond. If the two plies are united by heat and pressure without solvent and the temperature is raised above about 220° C., the product will have a curl imparted to it by the operation in which the plies are united.

I claim:

1. A tube of multi-ply, curled rubber hydrochloride film.

2. A tube of two-ply, curled rubber hydrochloride film, the two plies having perpendicular grains imparted by stretching, opposite edges of the film being coalesced together.

3. A tube of two-ply, curled rubber hydrochloride film, the inner ply possessing strains imparted by stretching and the outer ply being cast, the opposite edges of the film being coalesced together.

4. The method of forming a tube which comprises laminating at least two plies of rubber hydrochloride film which possess different strains due to having been differently stretched, heating the laminated sheet thereby causing it to curl, and uniting edges of the curled sheet to form a sipper.

5. The method of producing a tube which comprises stretching one ply of rubber hydrochloride film, uniting it to a ply of cast film, heating the laminated product to cause it to curl, and uniting opposite edges of the curled sheet by heat and pressure to form the tube.

FOSTER J. YOUNG.